Figure 1A:
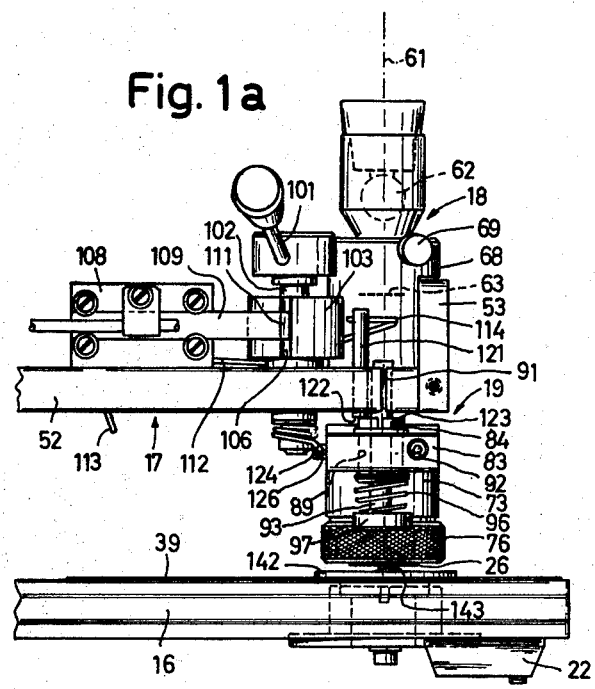

United States Patent
Fischer

[15] 3,705,305
[45] Dec. 5, 1972

[54] INSTRUMENT FOR MEASURING THE THICKNESS OF LAYERS WITH RADIO-ACTIVE NUCLEIDES

[72] Inventor: Helmut Fischer, Bergwaldstrasse 28, Gechingen, Germany

[22] Filed: Sept. 14, 1970

[21] Appl. No.: 66,706

[30] Foreign Application Priority Data

Aug. 10, 1970 Germany..................P 20 39 646.7

[52] U.S. Cl...............................250/83.3 D, 250/105
[51] Int. Cl..................................................G01t 1/16
[58] Field of Search .250/83.3 R, 83.3 D, 105, 106 S, 250/59; 33/189

[56] References Cited

UNITED STATES PATENTS 2,934,829  5/1960  Bohn....................................33/189
2,955,205  10/1960  Camfferman.....................250/105 X
3,156,824  11/1964  Peyser................................250/105

Primary Examiner—James W. Lawrence
Assistant Examiner—Davis L. Willis
Attorney—Milton Robert Kestenbaum

[57] ABSTRACT

An instrument for measuring the thickness of layers by means of radiation emitted from radio-active nucleides which interact with material of the layer and are then absolved by a radiation detector. A sighting mechanism determines the area of the layer to be irradiated and a diaphragm is interposed between the radio-active nucleide and the layer to define this area. A radiation detector on a supporting device can be moved into and out of a measuring position relative to this area. The sighting mechanism is operational when the radiation detector is out of measuring position and vice versa.

26 Claims, 13 Drawing Figures

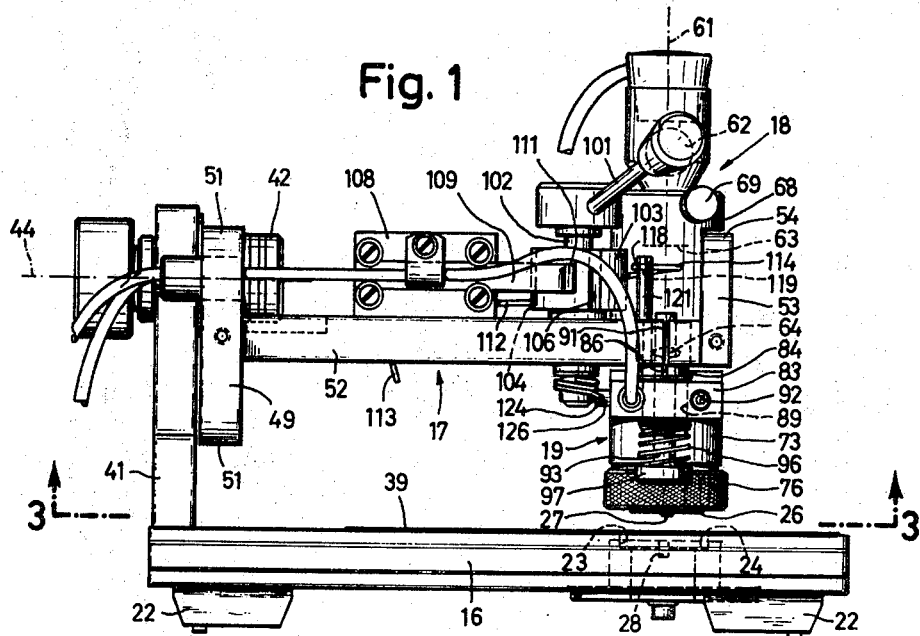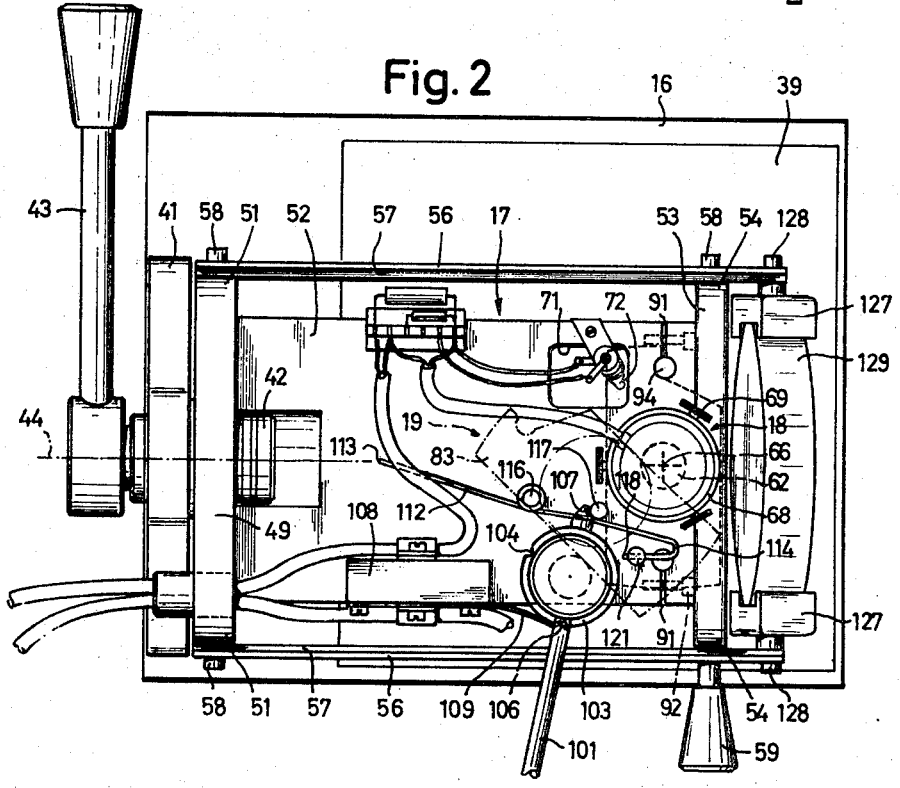

INVENTOR.
HELMUT FISCHER

INVENTOR.
HELMUT FISCHER

INSTRUMENT FOR MEASURING THE THICKNESS OF LAYERS WITH RADIO-ACTIVE NUCLEIDES

The invention relates to an instrument for measuring the thickness of layers by means of radiation emitted from radio-active nucleides which interact with the material of the layer and are then absolved by a radiation detector, said measuring instrument comprising a sighting mechanism for determining the area of the layer to be irradiated and a diaphragm which is interposed between the radio-active nucleide and the layer to define said area.

With this type of measurement it is known practice to use diaphragms, the apertures of which can be dimensionally compared with the areas to be measured. For example, these apertures may be in the form of slits and if this slit receives a wire having a diameter which is slightly greater than the width of said slit, the position of the wire in the slit clearly indicates the area in which the wire is measured. This area may be easily and accurately determined to within several tenths of a millimeter and its position estimated relative to the aperture of the diaphragm.

If however the section to be measured is part of a greater area, the measuring head which usually consists of a Geiger counter and a diaphragm conceals the area to be measured so that it is impossible to known with any great accuracy which area is actually masked by the aperture of the diaphragm. The term "greater area" cannot be misunderstood in this case since it refers to that surface which indicates for example the conductor path of a printed circuit. With the measuring apparatus mentioned at the beginning it is necessary to be in a position to make different individual measurements on different sections on a conductor path.

Printed circuits cannot therefore be mounted on a rigidly located apparatus having a diaphragm ring, because the bearing surface on the diaphragm is too small and can wobble as a result of the large gap. However for correct measurement it is necessary that the outer edge of the aperture in the diaphragm precisely defines the area to be measured, which is normally possible when said edge lies adjacent to the surface of the area. It is therefore necessary to mount printed circuits or other such bulky paths on a table so that they can remain lying in a defined and reproduceable position.

In solving such problems it is known practice to place the object to be measured on a support or bed with the side to be measured pointing upwards and to place a ring of approximately 10 centimeters diameter on this object to be measured. Inserted in this ring is a precisely fitting magnifying glass, the mount of which has a reticule and a lateral opening through which light can pass. The ring is then moved until the reticule indicates the area to be measured, the magnifyer is removed from the ring and a measuring head comprising a diaphragm and counter which are modified for hand measurement is inserted. The hand measuring head requires modification in this case and it is particularly difficult to avoid moving the ring or causing it to wobble when the magnifyer is removed and the measuring head inserted. Both the mount of the magnifyer and the hand measuring head must fit into the ring and be removable therefrom. This pre-supposes play which reduces the tolerance. Moreover, the printed circuit or the object to be measured must be larger than the ring because accurate measurement is otherwise impossible since the area to be measured would be displaced in any case in the actual ring. It is nevertheless still possible to take measurements using diaphragms and counters of normal size so that all the back-scattered radiation is received by the counter. It is also possible to use diaphragms of normal size which can be used in the hand measuring head as well as in conventional measuring apparatus.

If, however, it is desired to measure cylindrical faces having a larger radius, the adjusting operation becomes even more difficult, since it is necessary to provide in addition an adaptor ring which is arranged around the hand measuring head and has a 45° notch in which the object to be measured is fixed.

It is also known practice to use a ring, in the geometrical longitudinal axis of which is located a Geiger counter which is approximately as thick as a pencil, the lower section of the counter being closed by a diaphragm, and between the counter and the ring there is a body made of fine glass which is provided with a reticule on its lower side and illuminated by floodlit sources of light in the ring. This apparatus does not have the most important point on the reticule, namely the point of intersection, because the counter or, to be more precise, the diaphragm is located at this point and despite miniaturization, is of such a size that it extensively covers the area to be measured and as before it is necessary to relay on estimating accurately the position of the diaphragm aperture relative to the area to be measured. If the counter is miniaturized, it no longer collects as much back-scattered radiation as a counter of normal size and the measuring effect which lies within the region of 5 to 20 percent in the case of counters of normal size is unfortunately even further diminished in this case. Both this apparatus and the initially described apparatus constitute special embodiments which can only be further used in conventional measuring apparatus after time-wasting modification.

This apparatus was originally calibrated so that the existing or imaginary central point of intersection on the reticule corresponds to the diaphragm aperture and is even in alignment with a cross-piece of the reticule in the case of apertures in the form of longitudinal slots. It is necessary to rely on this relationship remaining during the entire life of the apparatus, since subsequent calibration is practically impossible.

The object of the invention is to provide an apparatus which eliminates all of the above-mentioned disadvantages and which, if required, can be converted by means of a few handles into an apparatus which can operate according to the method of irradiation and with which it is possible, after a little manipulation, to bring small objects not automatically mounted on the diaphragm into their correct position and with which, after a little manipulation, it is also possible to measure large objects lying on a table.

This problem is solved in accordance with the invention in that attached to a supporting device there is the radiation detector which can be moved into a measuring position relative to the area to be measured and away from the area and therefore out of the measuring position, in that the sighting mechanism is in operation when the radiation detector is out of the measuring position, and in that the sighting mechanism is out of operation when the radiation detector is in the measuring position.

Beta-radiation detectors are the best means for using radio-active nuclides although measurement by a gamma-radiation detector is basically also possible. The sighting mechanism can be of a mechanical or optical nature. If it is mechanical, it can for example comprise a wire, the end of which can be pivoted towards the area so that it is possible to take a sight on the area by means of the wire end. A Geiger counter is normally used as a radiation detector.

Figure 3:
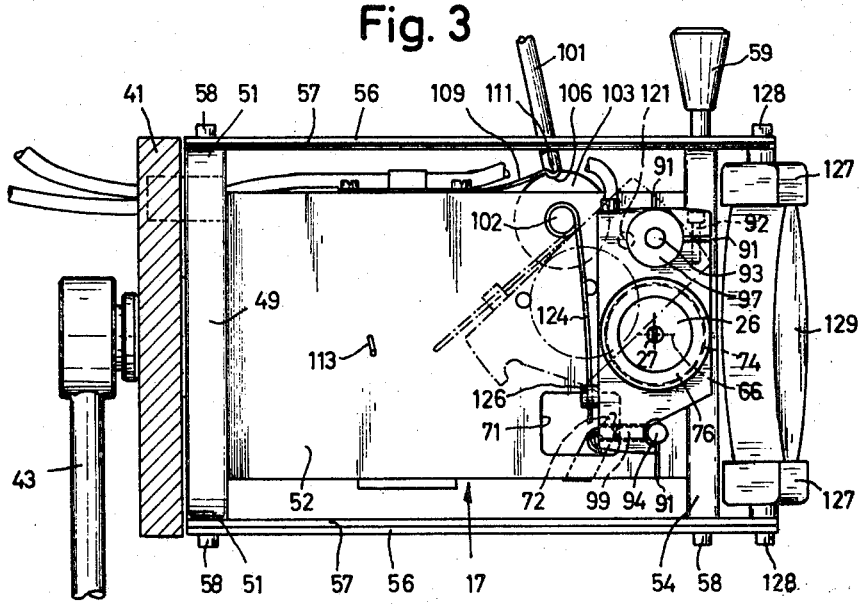
Figure 4:
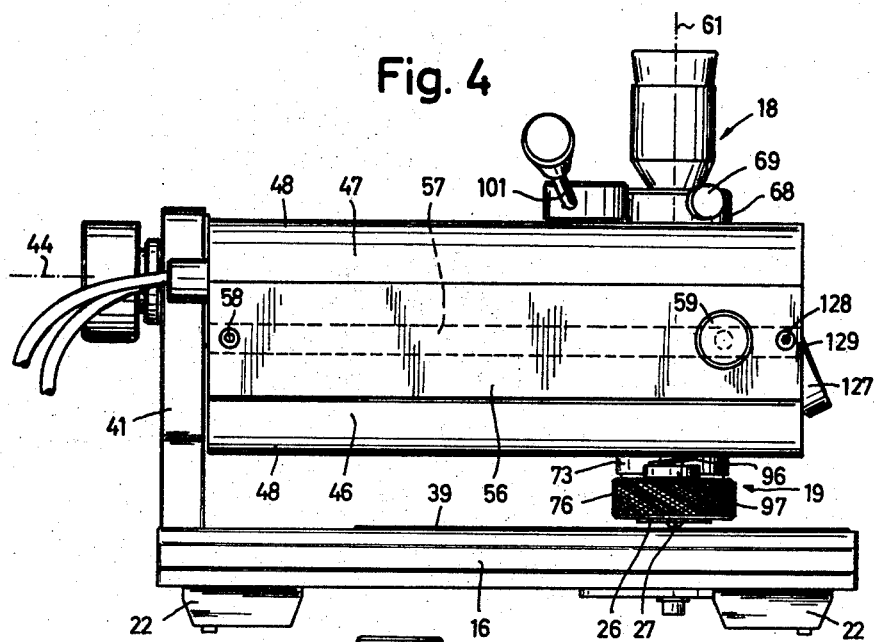
Figure 5:
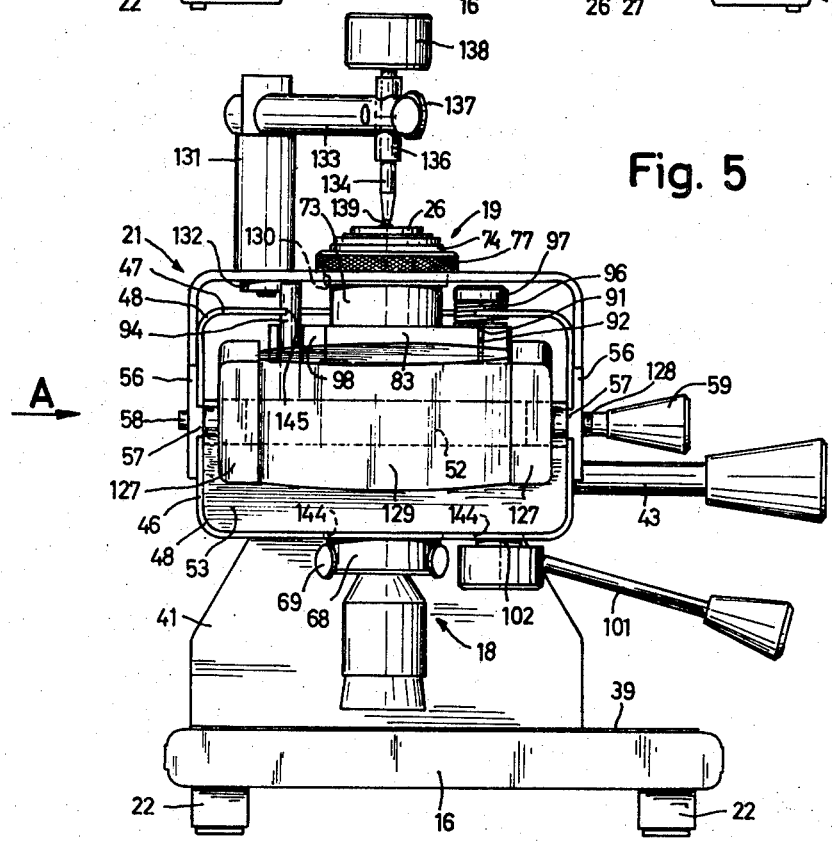
Figure 6:
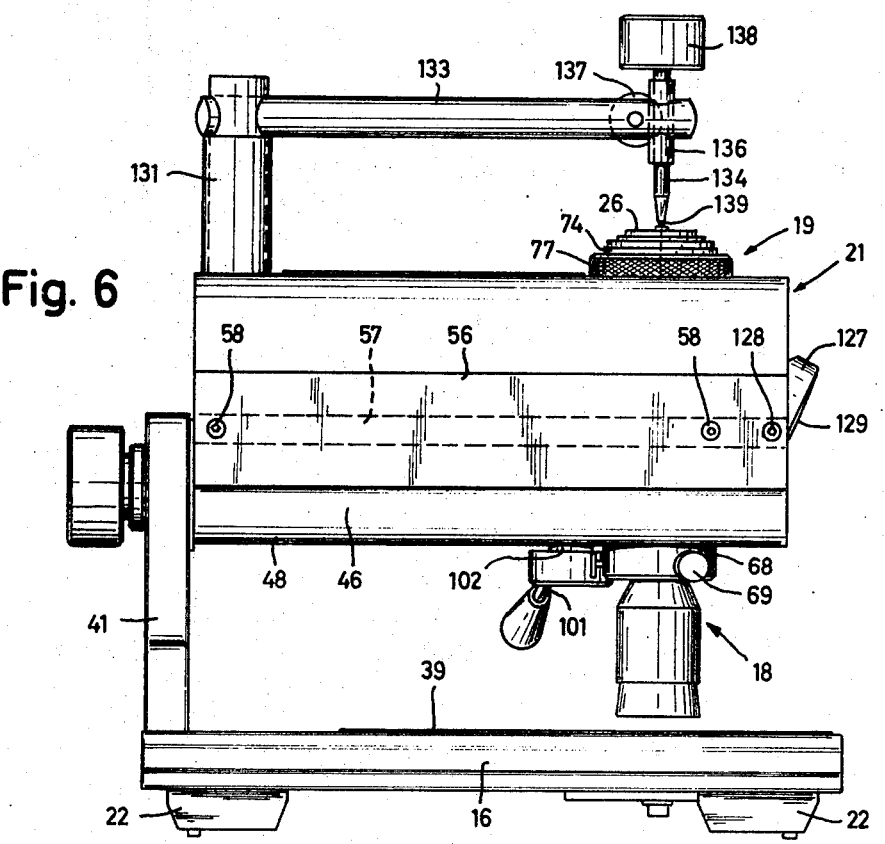
Figure 7:
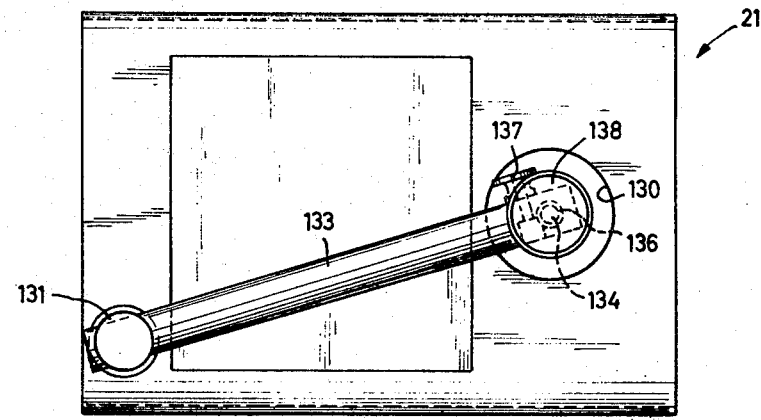
Figure 8:
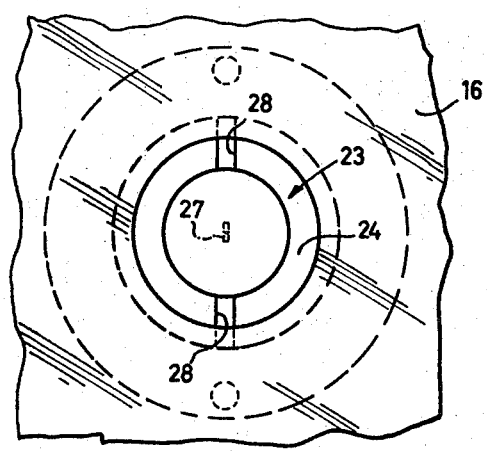
Figure 9:
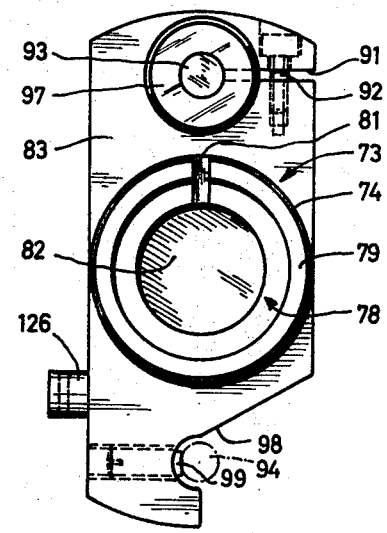
Figure 10:
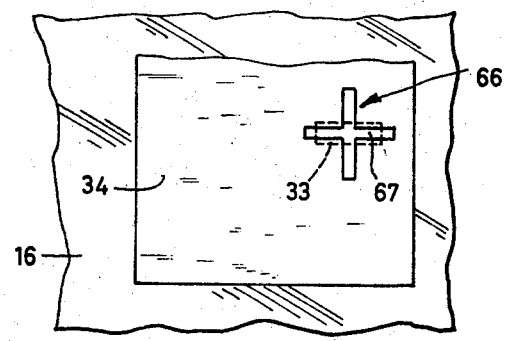
Figure 12:
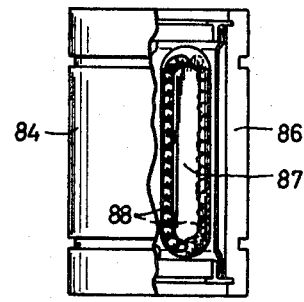
Figure 11:
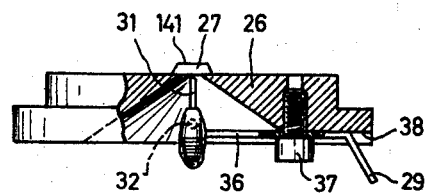

Other advantages and features of the invention are shown in the following description of preferred embodiments. In the drawing:

FIG. 1 shows a side view of the apparatus with the facing removed, the measuring head having been pivoted, but not yet lowered into its operative position, FIG. 1a shows the right-hand section of FIG. 1 with the measuring head lowered, FIG. 2 shows a plan view of FIG. 1, but with the measuring head in the lowered position and the position in which the measuring head is pivoted out of the path of radiation of the sighting mechanism being indicated by dot-and-dash lines, FIG. 3 shows an underneath view of FIG. 2 along the line 3—3 shown in FIG. 1, FIG. 4 shows a side view of FIG. 1, but with the covering and measuring head lowered, FIG. 5 shows a front view of the apparatus with its cover and attachments mounted thereon, FIG. 6 shows a side view of FIG. 5 in the direction of the arrow A, FIG. 7 shows a plan view of the attachment, FIG. 8 shows a plan view of the support for the diaphragm in the table, FIG. 9 shows a view of the measuring head alone in the direction of the arrow B in FIG. 1, but without showing the diaphragm, FIG. 10 shows a plan view of the area to be measured and the reticule and the place (shown by broken lines) to be later occupied by the slit, FIG. 11 shows a partial radial section through the diaphragm, FIG. 12 shows a partially cut-away axial view of a bearing bush.

The apparatus of the preferred embodiment comprises a table 16, a frame 17, a flying spot generator 18, and a measuring head 19 which can be alternated with an attachment 21 (FIG. 7).

The table 16 is heavy and rigid. It has four feet 22 and below the measuring head 19 is a support 23 consisting essentially of a two-stage bore, the surrounding edge 24 of which can precisely support a diaphragm 26. In order that a slot 27 which is indicated by broken lines in FIG. 8 to represent the diaphragm, may also occupy a precisely defined position, two diametrical grooves which can receive a positioning tongue 29 of the diaphragm 26 are produced in the edge 24. This can ensure that the slot 27 always extends perpendicularly to the plane of the drawing in FIG. 1. If the diaphragm only has a circular aperture, assistance is not required for positioning. When the diaphragm 26 is located in the support 23, its screening tube 31 in the lower portion of which lies the radio-active nuclide 32 extends upwards. The rays can then be emitted in an upward direction from the screening tube 31 and can irradiate the area 33 of a layer 34 defined by the slot 27, which is indicated by broken lines in FIG. 10. Below the screening tube 31 is a holder which leads into the already mentioned positioning tongue 29, and they are all secured from below by a screw 37. Part of the holder 36 and the positioning tongue 29 bear against the base 38 of a radial groove. It is unnecessary in this case to give a more detailed description of the diaphragm since it is known per se. In the described position the diaphragm 26 combines with the other apparatus for the purposes of irradiation and for this purpose the diaphragm 26 is removed from the measuring head 19 according to FIG. 1 and placed below in the support 23.

A detachable white foil 39 is adhesively mounted on the table 26.

On the left-hand side of FIG. 1 the table is firmly screwed to a rigid and approximately trapezoidal column 41, in the upper section of which an axle 42 is pivotably mounted and can be loosened or tightened by a lever 43 so that it is possible to pivot the frame 17 about a geometrical longitudinal axis 44 and to pull the lever 43 after pivoting so that the frame 17 is rigidly clamped to the column 41. Only two pivoting positions are involved in this case, namely the positions shown in FIG. 1 or that position shown in FIG. 5 in which the measuring head 19 points upwards. The pivoting movement is made possible because the distance between the table 16 and the geometrical longitudinal axis 44 is greater than the vertical distance between the geometrical longitudinal axis 44 and the outermost sections of the measuring head 19 and the flying spot generator 18. To make pivoting possible in spite of the compact construction the upper shell half 46 and the lower shell half 47, which are to be discussed later are provided with rounded edges 48 at those points where the horizontal walls join the vertical walls.

The frame 17 comprises a solid vertical rear cheek portion 49 which is rectangular in shape and has rounded corners 51 corresponding to the internal radius of the rounded corner 48 so that the shell sections 46, 47 are also simultaneously supported. Lying parallel to the longitudinal axis 44 is a rectangular metal plate 52 which is likewise rigid and its left-hand end is rigidly connected to the cheek portion 49. As can be seen, the cheek portion 49 extends as far below as above the plate 52. At its right-hand end the plate 52 is also rigidly connected to a metal cheek portion 53 which however only projects upwards from the plate 52 as seen in FIG. 1, but which also has rounded corners 54 corresponding to the rounded corners 51 so that the shell sections 46, 47 are supported also at the front.

The shell sections 46, 47 are pressed against the frame 17 by means of T-shaped strips 56 having a very short base 57 and screws 58, which in one case take the form of a pivotable handle 59, and are in addition partly responsible for the stiffening of the extremely rigid frame 17 which can therefore be loosely mounted on the left-hand side in FIG. 1 so that the right-hand section can be left free for handles, samples to be measured and for viewing.

This section is provided with the basically known flying spot generator 18 which has an optical axis 61 approximately perpendicular to the geometrical longitudinal axis 44. This flying spot generator 18 is known per se; its upper portion comprises a bulb 62 and its interior comprises a device 63 which is a diaphragm in the form of a capstan, and the lower portion comprises a projection lens 64 so that the flying spot generator 18 is capable of producing, approximately in the plane of the upper side of the table 18, a sharply defined cross of light 66, the cross-pieces 67 of which are vertically positioned on top of one another and their width is of the order of the width of the slot 33, i.e. in the preferred embodiment narrower by a factor of 2, as shown in FIG. 10. The width of the cross-pieces 67 is approximately 0.3 mm. The flying spot generator 18 is rigidly attached to a solid tube 68 on the plate 52, the upper section of said tube being penetrated by three adjustable screws which are each staggered at an angle of 120° relative to one another. These adjustable screws 69 make it possible to vary the optical axis 61 by a few degrees so that the projected cross of light 66 may be allowed to move slightly.

Behind the measuring head 19 is a recess 71 in which there is provided a 6 volt bulb 72 which provides general lighting for the area around the support 23.

The measuring head 19 is provided with a counter 73 which is connected in known fashion and the leads of which are not shown — as in all other cases. The area directed away from the longitudinal axis 44 is provided with an external thread 74 on which a screw cap 76 can be screwed for securing the diaphragm 29 in the position as shown in FIG. 1 or a screw cap 77 for securing the attachment 21 as shown in FIG. 5. The screw cap 77 does not secure the diaphragm 26 in FIG. 5. Instead it lies loosely in the support 78 which is identical to the support 23 and has a surrounding edge 79 which is sunk inwards and has a groove 81 for receiving the positioning tongue 29. FIG. 9 shows the diaphragms 82 of the counter 73 because the diaphragm 26 is not shown therein. The screw cap 76 is also omitted.

The upper end of the counter 73 shown in FIG. 1 is rigidly connected to a slide piece 83 which is approximately rectangular in shape, is made of metal and is rigid. Its upper and lower sides lie parallel to the plate 52 or, which is the equivalent, approximately perpendicular to the optical axis 61. When in the position shown in FIGS. 1 and 3 the longitudinal axis of the counter 73 which is in the shape of a circular cylinder is almost or completely precisely parallel to the optical axis 61. The slide piece 83 is vertically penetrated by a bearing bush 84 which is rigidly connected to the slide piece 83 and provided with a radial slot 86 and ball bearings 88 supported inside a cage 87. This bearing bush 84 is a basically known component and does not require any particular description. The recess 89 for the bearing bush 84 is radially connected to an open-edged slot 91 which can be tightened slightly by a screw 92 so that the recess 89 can be made smaller, thereby also reducing the size of the radial slot 86 which is perpendicular to the slot 91. This apparatus makes it possible to guide the bearing bush 84 without play and with a minimum of friction against a guide pin 93, the upper end of which is rigidly and vertically secured in the plate 52 as shown in FIG. 1. The longitudinal axis of the guide pin 93 lies in the median plane of the slot 27 of the diaphragm 26. Another well selected position could naturally also be used. For example, the median plane of the slot 27 could be placed also in the plane of the drawing so that the connecting planes of the longitudinal axis of the guide pin 93 and the longitudinal axis of a pin 94 lie perpendicular to one another.

The bearing bush 84 is considerably shorter when the guide pin 93 projects downwards and its section extending below the slide piece 83 also acts at the same time as a guide for a helical spring 96, one end of which bears against the slide piece 83 and the other end against a head 97 of the pin 94. The spring 96 attempts to push the measuring head 19 upwards until the upper face of the bearing bush 84 bears against the lower side of the plate 52.

In the slide piece 83 there is provided a hollow groove 98 which is cut along the lines shown in FIG. 9. The hollow groove 98 leads to a stop screw 99 which can be adjusted until the longitudinal axes of the guide pin 93, the pin 94 and the counter 73 pass through a common plane. Because of its better sliding properties the stop screw 99 is made of plastics material, whereas the pin 94 is made of metal, its upper end being rigidly connected to the plate 52.

With this embodiment therefore the measuring head 19 can be moved into the position shown in FIG. 1, the lower position shown in FIG. 1a and into the pivoted position shown by broken lines in FIG. 2. The co-ordination of these movements is effected by the device to be described, in which springs are therefore used to mechanically disengage it from the measuring head 19 to a certain extent so that a direct rigid action thereon is impossible, so that nothing can be bent by undesirable obstacles, so that adjustment is no longer true and so that the measuring head 19 is lowered as far is permitted by these samples of varying thickness to be measured. In addition, the considerable expense of transmission gears is also saved by using springs.

An operating lever 101 has a rotating axle 102 which is perpendicular to the plate 52 and is rotatably, but axially rigidly mounted therein near its lower edge shown in FIG. 2. The upper part of the axle 102 is non-rotatably connected to a locking member 103 which has on its periphery two axial grooves 104 and 106 separated from one another by almost 90°. A stop pin 107 which is radially located in the locking member 103 lies almost diametrically opposite the groove 106. Rigidly secured on the plate 52 is a retaining lock 108 which is attached to one end of a flat coil spring 109, its other end being free and having a socket 111 which either slides along the periphery of the locking member 103 or engages in the locking grooves thereby securing the locking member 103, and the socket 111 is located in the locking groove 104 when the measuring head 19 occupies the position indicated by broken lines in FIGS. 2 and 3, and is located in the groove 106 when the measuring head 19 occupies the low position shown in FIG. 1a. When the measuring head is only previously pivoted, but not yet lowered, it occupies the position shown in FIG. 1.

One end 113 of a rod-shaped spring 112 is passed through a bore in the plate 52 at the point indicated and bent through approximately 90° so that it extends to the right and forward at an acute angle as shown in FIGS. 1 and 2. Its right-hand end 114 is U-shaped. To prevent the spring from moving too far upwards, there is provided a stop pin 116 which is located approximately halfway along the spring 112. A pin 117 which is perpendicular to the plate 52 as shown in FIG. 2, together with the stop pin 107 and the locking member 103, provide a stop for the rotating axle 102 when the socket 111 is in the locking grove 106. The axle 102 as shown in FIG. 2 cannot be rotated in a clockwise direction. The spring 114 is previously tightened so that its end 114 will move away from the plate 52. If the operating lever 101 is rotated so that the stop pin 102 as shown in FIG. 2 moves from the 10 o'clock to the 1 o'clock position, there is at first no contact between the stop pin 107 and the spring 112 in the 10 o'clock position and only the pin 116 prevents it from rising too far above the plate 52. In the 11 o'clock position the stop pin 107 comes into contact with the spring 112 for the first time and pushes it further and further upwards with its end 114 until the stop pin 107 bears against the pin 116.

The end 118 of the spring 114 is freely located in a bore 119 of a stop pin 121 which is cylindrical and can slide longitudinally through a bore in the plate 52 lying near the bore for the guide pin 93. The lower face 122 (FIG. 1a) of the stop pin 121 can therefore be permanently supported on the upper face 123 of the bearing bush 84. If therefore the end 114 of the spring 112 is moved downwards, it also presses the stop pin 121 downwards in opposition to the force of the helical spring 96, thereby also pressing the entire measuring head 19 downwards. As shown in FIG. 1a the end 118 comes to rest slightly above the spring 112, which means that the spring 112 is advantageously twisted a little more.

The pivoting movement of the measuring head 19 is also derived from the rotating axle 102, and for this purpose one end of a rod-shaped spring 124 is nonrotatably connected to that part of the axle 102 below the plate 52. The other end of the spring 124 lies loosely in an eye 126 of the sliding piece 83. The eye 126 is located in the vicinity of the hollow groove 98 on its rear side so that, when in the position shown in FIG. 3, the spring 124 pushes the sliding piece 83 gently, but with sufficient force, against the pin 94. A comparison between FIGS. 1 and 1a shows that the spring 124 is capable of assisting the raising and lowering of the measuring head 19 and can also assist the helical spring 96 in its preliminary tension. As shown in FIG. 3, the spring rod 124 also acts at the same time as a means of gently stopping the sliding piece 83 when the measuring head 19 is pivoted away.

FIG. 2 also shows that the bulb 72 is not covered when the measuring head 19 is pivoted completely forward or backward.

The cross of light 66 is indicated by broken lines in FIGS. 2 and 3 and it can be seen from these FIGS. that, when in the operative position, the measuring head 19 is located in the light path of light 66 which is therefore screened. As shown in FIGS. 2, 3 and 5 a cushion-shaped magnifyer 129 is arranged in an inclined position between two edge supports 127 and screws 128 at the front ends of the parallel horizontal strips 56 so that the area can be seen magnified under the measuring head 19. The magnifyer 129 cannot fall out when in the upwardly pivoted position shown in FIGS. 5 and 6 because it would only move against the cheek portion 53.

The attachment 21 which is supported on the upper side of the strip 56 is mounted in this position. When in this position the helical spring 96 has one more function: the more the screw cap 77 is tightened, the further the counter 73 is moved upwards through the recess 130 and the further the helical spring 96 is extended, so that it pulls the attachment 16 downwards thereby pressing it more against the strip 56.

Supported on the attachment 21 is the rear end of a tube 131 which is secured by a screw 132 and is penetrated at the top by a horizontal cross member 133, the free end of which is vertically penetrated by a retaining pin. This pin is freely guided so as to be longitudinally slidable in a tube 136 which can be clamped to the cross member 133 by means of a screw 137 depending on the vertical position so that a weight 138 which is rigidly connected to the upper end of the retaining pin 134 can be moved downwards depending on the vertical position of the tube 136, provided that the lower rubber end 139 of the retaining pin 134 rests on a sample located in the slot 27.

The described apparatus can therefore be used in accordance with the method of irradiation. For this purpose the diaphragm 26 is placed in the support 23, the layer 34 placed on the table 16 and the measuring head 19 lowered. In this connection the upper edge 141 of the slot 33 projects only a few tenths of a millimeter above the foil 39. The measuring head 19 (naturally without the diaphragm 26) is then lowered and a measurement taken.

Alternatively, with the back-scattering method the diaphragm 26 is screwed into position in front of the counter 73 and the layer 34 placed beneath the slot 27, said layer being supported from below by the support 23, because the latter contains a supporting disc (not shown) which forms a continuation of the upper table surface.

Finally, another back-scattering method is possible as shown in FIG. 4 and 5, wherein the diaphragm 26 is simply placed on the counter pointing upwards and the sample is pressed down onto the slot 27 by a retaining pin.

To ensure that the slot 27 is also located at the desired point when used in the manner shown in FIG. 1, the apparatus is adjusted as follows: as shown in FIG. 1a a plate 142 carrying a small heap of moldable material 143 is introduced under the measuring head 19 which is lowered until the slot 27 forms an impression in the moldable material 143. The measuring head 19 is then pivoted back so that the cross of light 66 is cast downwards. The adjustable screws 69 are then turned until the cross of light 66 coincides precisely with the impression of the slot in the moldable material 143 in the desired manner.

It can be seen that for this purpose the optical axis 61 does not have to be in precise alignment with the equivalent axis of the measuring head. It will generally do so, but it is not necessary to coincide precisely. The only condition is that the cross of light 66 should meet the point where the slot 27 is later located, which could also be obtained with an image projected at an angle.

This description also shows that excessive demands do not have to be made on guiding means for the measuring head 19 in spite of the high-precision end result, since its only function is to bring the measuring head again and again into its operative position, and it is basically unimportant how this is done. For example, compressed air devices could also be used. When applying the method of irradiation a gap is sometimes required between the diaphragm 26 and the measuring head 19 (measuring head 19 without diaphragm 26) so that a plate-shaped object to be measured can be passed through the gap without touching the measuring head 19. For this purpose the lowering movement could be limited by providing another adjustable stop which is not shown.

What I claim is:

1. Measuring apparatus for measuring the thickness of layers by means of radiation emitted by radio-active nucleides which interact with the material of the layer and are then absorbed by a radiation detector, said apparatus comprising a sighting mechanism for determining the area of the layer to be irradiated, a diaphragm which is interposed between the radio-active nucleide and the layer to define the area for measurement, a supporting device and a radiation detector attached to said supporting device which can be moved towards the area to be measured and into a measuring position and away from the area to be measured and out of the measuring position, said sighting mechanism being in operation when said radiation detector is away from the measuring position and out of operation when said radiation detector is in the measuring position.

2. Measuring apparatus as claimed in claim 1, in which said sighting mechanism is a flying spot generator which is capable of casting onto the area to be measured a spot of light, the dimensions of which are of the order of those of the area to be measured.

3. Measuring apparatus as claimed in claim 2, in which the optical axis of said flying spot generator is approximately coaxial with the direction or radiation.

4. Measuring apparatus as claimed in claim 1 in which said radiation detector is located between said sighting mechanism and the area to be measured.

5. Measuring apparatus as claimed in claim 3 in which said optical axis is adjustable.

6. Measuring apparatus as claimed in claim 1 in which said sighting mechanism provides a spot of light in the form of a cross having two cross pieces intersecting at right angles and corresponding in width to the dimension of the area to be measured.

7. Measuring apparatus as claimed in claim 1 in which said diaphragm has an aperture for defining the area to be measured, is made of a material having a low atomic number and holds the radio-active nuclide in a support which opens towards the aperture, but does not transmit any radiation in other directions.

8. Measuring apparatus as claimed in claim 7, in which in the case of back-scattering said diaphragm can be attached to said radiation detector between the latter and the area to be measured and, alternatively in the case of irradiation said diaphragm can be placed in a support in a table beyond the area to be measured.

9. Measuring apparatus as claimed in claim 1 in which said diaphragm has an aperture which differs from circular shape, and adjusting means make it possible to bring a preferred direction of the aperture into alignment with a cross-piece of a light spot provided by said sighting mechanism.

10. Measuring apparatus as claimed in claim 1 in which said supporting device and said sighting mechanism are provided on a frame which can be pivoted through 180° about its approximately horizontal longitudinal axis.

11. Measuring apparatus as claimed in claim 10, in which the longitudinal axis is arranged at such a height above a supporting table that a free pivoting movement is possible.

12. Measuring apparatus as claimed in claim 10 in which said frame is connected to a column connected to a table by a floating axle and said supporting device and said sighting mechanism are provided in the section of the frame removed from this axle.

13. Measuring apparatus as claimed in claim 10 in which the optical axis of said sighting mechanism, the longitudinal axis of said frame and the direction of radiation all intersect.

14. Measuring apparatus as claimed in claim 12 in which the area of said frame removed from said axle supports a magnifyer which is directed towards the area to be measured.

15. Measuring apparatus as claimed in claim 10 in which a source of general lighting is provided on said frame for illuminating the area to be measured.

16. Measuring apparatus as claimed in claim 1 in which a proofing foil having a high degree of reflection is provided on a table for supporting the layer to be measured.

17. Measuring apparatus as claimed in claim 1 which said supporting device on a frame and has a downward pointing guide pin which extends approximately perpendicular to a supporting table and approximately parallel to the direction of radiation, in which the radiation detector is rigidly secured under a sliding piece which is pivotably penetrated by said guide pin so as to be longitudinally slidable between two axial stops and in which there is provided at least one more stop which limits the pivoting movement in the operating position of the radiation detector.

18. Measuring apparatus as claimed in claim 17, in which said sliding piece comprises a bearing bush which can be adjusted without play, said bearing bush being penetrated by said guide pin and rigidly connected to said sliding piece.

19. Measuring apparatus as claimed in claim 17, in which said one more stop is a pin which is rigidly connected to said frame, projects downwards parallel to said guide pin and bears against a hollow groove of the sliding piece which has an opening angle of less than 270°.

20. Measuring apparatus as claimed in claim 19, in which an adjustable stop screw for said stop pin leads into said hollow groove.

21. Measuring apparatus as claimed in claim 17 in which a rotatable axle having an operating lever and a locking device in a plurality of rotary positions is provided parallel to and in the vicinity of said guide pin, one end of said axle driving a drivable spring rod, the free end of which co-operates with said sliding piece resiliently guiding the latter during its rotation, and on said axle there is provided a third stop which, with the aid of an interposed second spring, can move a stop pin which is longitudinally slidable in said frame and mounted preferably parallel to said guide pin in the direction of the area to be measured, and said stop pin bears against said sliding piece in the vicinity of said guide pin.

22. Measuring apparatus as claimed in claim 21, in which said rod-shaped second spring is clamped at both ends, one end being clamped on said frame and the other end on said stop pin, in which said third stop pushes this spring in the direction of the area to be measured, and in which there is provided a third spring which has a preliminary tension pushing said sliding piece away from the area to be measured.

23. Measuring apparatus as claimed in claim 22, in which said third spring is a helical spring, which is interposed between the free end of said guide pin and said sliding piece.

24. Measuring apparatus as claimed in claim 23, in which an attachment which is penetrated through an aperture at least by said diaphragm can be mounted on said frame or its cover when the radiation is projected upwards, in which said radiation detector can be rigidly, but releasably connected to said attachment, and in which an adjustable means in the form of a gallows for retaining the sample is located on said attachment.

25. Measuring apparatus as claimed in claim 24, in which there is provided a screw cap which, being screwed onto an external thread of said radiation detector and supported on said attachment near the edge of said aperture, draws said radiation detector into said aperture in opposition to the force of said second and preferably also said third spring.

26. Measuring apparatus as claimed in claim 24, in which said cover comprises two shell sections, one including openings for said sighting mechanism and said rotating axle and the other including openings for looking through a magnifier, for said radiation detector and its movements, said guide pin and said stop pin, in which the two shell halves are identical in outline and have U-shaped cross sections, and in which they are clamped on said frame by means of two cover strips.

* * * * *